US012663274B2

(12) United States Patent
Shelukha et al.

(10) Patent No.: US 12,663,274 B2
(45) Date of Patent: Jun. 23, 2026

(54) SYSTEMS AND METHODS FOR CHARACTERIZING ROAD SEGMENT DIFFICULTY

(71) Applicant: Toyota Motor North America, Inc., Plano, TX (US)

(72) Inventors: Anna D. Shelukha, Lewisville, TX (US); Joshua Daniel Payne, Ann Arbor, MI (US); Aaron Douglas Miers, The Colony, TX (US); Juan Angel Acosta Meza, The Colony, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 368 days.

(21) Appl. No.: 18/125,969

(22) Filed: Mar. 24, 2023

(65) Prior Publication Data

US 2024/0318966 A1    Sep. 26, 2024

(51) Int. Cl.
*G01C 21/34*      (2006.01)
*G01C 21/36*      (2006.01)
*G05D 1/00*       (2006.01)

(52) U.S. Cl.
CPC ....... *G01C 21/3461* (2013.01); *G01C 21/365* (2013.01); *G05D 1/0088* (2013.01); *G05D 1/02* (2013.01)

(58) Field of Classification Search
CPC .............. G01C 21/3461; G01C 21/365; G01C 21/3819; G01C 21/3492; G01C 21/3867; G05D 1/0088; G05D 1/02; B60W 40/072; B60W 60/001; B60W 2050/143; B60W 2050/146; B60W 50/14
See application file for complete search history.

(56) References Cited

U.S. PATENT DOCUMENTS

| | | | |
|---|---|---|---|
| 7,555,385 B2 * | 6/2009 | Niwa .................... | B60W 30/00 |
| | | | 701/448 |
| 8,781,730 B2 | 7/2014 | Downey et al. | |
| 11,370,433 B1 * | 6/2022 | Saito .................... | B60T 8/1755 |

(Continued)

FOREIGN PATENT DOCUMENTS

| | | |
|---|---|---|
| EP | 1559994 A2 | 8/2005 |
| JP | H10-269495 A | 10/1998 |

(Continued)

OTHER PUBLICATIONS

Partial European Search Report for corresponding European U.S. Appl. No. 24/165,659 mailed Aug. 1, 2024, 11 pages.

*Primary Examiner* — Peter D Nolan
(74) *Attorney, Agent, or Firm* — Christopher G. Darrow; Darrow Mustafa PC

(57)      ABSTRACT

Systems, methods, and other embodiments described herein relate to improving vehicle control in relation to curved roadways. In one embodiment, a method includes, in response to determining a route for a vehicle that is represented using points for navigating to a destination, identifying one or more curves along the route according to proximities of the points. The method includes generating difficulty indicators for respective ones of segments that include the one or more curves. The method includes providing the difficulty indicators as the vehicle encounters the respective ones of the segments that include the one or more curves.

17 Claims, 6 Drawing Sheets

(56)        References Cited

U.S. PATENT DOCUMENTS

| | | | | |
|---|---|---|---|---|
| 2005/0187705 A1* | 8/2005 | Niwa | ................... | B60W 30/00 |
| | | | | 701/448 |
| 2005/0246091 A1* | 11/2005 | Kuroda | .............. | G01C 21/3697 |
| | | | | 701/1 |
| 2009/0018767 A1* | 1/2009 | Gehring | .............. | B60W 40/072 |
| | | | | 701/533 |
| 2009/0299617 A1* | 12/2009 | Denaro | .............. | G01C 21/3697 |
| | | | | 707/999.107 |
| 2023/0196148 A1* | 6/2023 | Fields | ................... | G06N 5/048 |
| | | | | 706/52 |

FOREIGN PATENT DOCUMENTS

| | | | | | |
|---|---|---|---|---|---|
| JP | 2005-257341 | A | 9/2005 | | |
| JP | 2006-048409 | A | 2/2006 | | |
| JP | 2006-113836 | A | 4/2006 | | |
| JP | 2006-153560 | A | 6/2006 | | |
| JP | 2009-032181 | A | 2/2009 | | |
| JP | 2014-034251 | A | 2/2014 | | |
| WO | 2006128601 | A1 | 12/2006 | | |
| WO | WO-2019118161 | A1 * | 6/2019 | ......... | B60W 60/001 |

* cited by examiner

SYSTEMS AND METHODS FOR CHARACTERIZING ROAD SEGMENT DIFFICULTY

TECHNICAL FIELD

The subject matter described herein relates, in general, to improving vehicle control for curved roadways, and, more particularly, to identifying curves using a point-based representation of a route.

BACKGROUND

Maps, in digital form and otherwise, may represent roads as simple lines that approximate road geometries at a course level. In general, the widths of the lines can represent an actual width of the road and/or a type of the road. However, maps that use lines in various styles for representing roadways do not convey information about finer aspects such as the severity of turns in a roadway, and so on. This lack of information is, in part, because the information is generally unavailable and is also difficult to acquire. For example, in one approach, a system may apply complex algorithms such as splines or other mathematical approximations to estimate roadway geometries. However, this approach is computationally intensive and thus does not generally integrate well with on-the-fly navigation. Therefore, the lack of information about a driving route can lead to greater stress on drivers and/or more complex navigation routines for automated driving systems.

SUMMARY

In various embodiments, example systems and methods relate to a manner of improving vehicle control for curved roadways through efficiently identifying road curvature using a point-based approach. As previously noted, map data can be very granular, thereby leaving characteristics about a roadway along a route with vague contextual information. Thus, vehicle systems and drivers may not be well informed about sharp turns and the general difficulty of navigating segments of a roadway.

Therefore, in one or more embodiments, an inventive system is disclosed that dynamically assesses roadway curvature using an efficient approach to improve available information about the roadway, including the difficulty of navigating roadway segments. For example, in one aspect, an inventive system initially acquires a route for a vehicle to navigate. The route is generally represented in the form of points that minimally define a geometry of the route in relation to associated roadways. That is, in order to simplify the representation, the route is not represented by lines and curves but is represented by a minimal set of points to approximate the route along various roadways. As such, the points may be sparse where the route is generally straight since fewer points are necessary to accurately represent a straight road, whereas curves and turns may be represented with significantly more points because of the more complex geometry. However, explicit information about curvature is still not available to the driver or various vehicle systems.

As such, the noted system functions to analyze the route to identify curves. Initially, the system determines segments of the route. In one approach, the system considers various characteristics of the route in order to segment the route. For example, the system determines expected vehicle speeds at each point along the route, a type of the road at each point, and so on. From these characteristics, the system defines the segments. In one arrangement, the system determines a length of each separate segment according to a distance the vehicle would likely travel on the road at the expected speed during a defined period of time (e.g., 20 seconds). In a further aspect, the system queries the points of the route according to a distance the vehicle is expected to travel and forms segments according to identified points within the distance or an extended distance when points are not returned. Thus, the separate segments may have different lengths. In any case, the system determines point densities for the segments, which are generally indicative of the presence of a curve.

That is, the system determines points of the route per segment, which generally indicates proximities within the segment. Because certain roadway features, such as curves, are represented using more points than straight sections of the roadway, the proximities (also referred to as densities) are indicative of the presence of curves within a segment. Accordingly, the system identifies the presence of curves according to the comparison of a proximity threshold that specifies, for example, a minimum density for the system to indicate the presence of a curve. Once curves have been identified, the system assigns difficulty indicators to the segments according to the curves. In one configuration, the system determines a severity of the curves according to the density for a particular segment and assigns the difficulty indicator as, for example, a score specifying the severity.

Thereafter, the system provides the difficulty indicators in various forms depending on the implementation in order to improve control of the vehicle. For example, the system can provide audible alerts, visual alerts, or other indicators to the driver about the difficulty of the segments when approaching. In a further aspect, the system provides information to, for example, an automated driving module (e.g., a path planning system) in order to provide awareness to the module about the upcoming geometry of the roadway, thereby facilitating improved control. In this way, the system improves the control of the vehicle along roads with curves.

In one embodiment, a routing system for improving vehicle control in relation to curved roadways is disclosed. The routing system includes one or more processors and a memory communicably coupled to the one or more processors. The memory stores instructions that, when executed by the one or more processors, cause the one or more processors to, in response to determining a route for a vehicle that is represented using points for navigating to a destination, identify one or more curves along the route according to proximities of the points. The instructions include instructions to generate difficulty indicators for respective ones of the segments that include the one or more curves. The instructions include instructions to provide the difficulty indicators as the vehicle encounters the respective ones of the segments that include the one or more curves.

In one embodiment, a non-transitory computer-readable medium for improving vehicle control in relation to curved roadways and including instructions that, when executed by one or more processors, cause the one or more processors to perform one or more functions is disclosed. The instructions include instructions to, in response to determining a route for a vehicle that is represented using points for navigating to a destination, identify one or more curves along the route according to proximities of the points. The instructions include instructions to generate difficulty indicators for respective ones of the segments that include the one or more curves. The instructions include instructions to provide the difficulty indicators as the vehicle encounters the respective ones of the segments that include the one or more curves.

In one embodiment, a method is disclosed. In one embodiment, the method includes, in response to determining a route for a vehicle that is represented using points for navigating to a destination, identifying one or more curves along the route according to proximities of the points. The method includes generating difficulty indicators for respective ones of the segments that include the one or more curves. The method includes providing the difficulty indicators as the vehicle encounters the respective ones of the segments that include the one or more curves.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
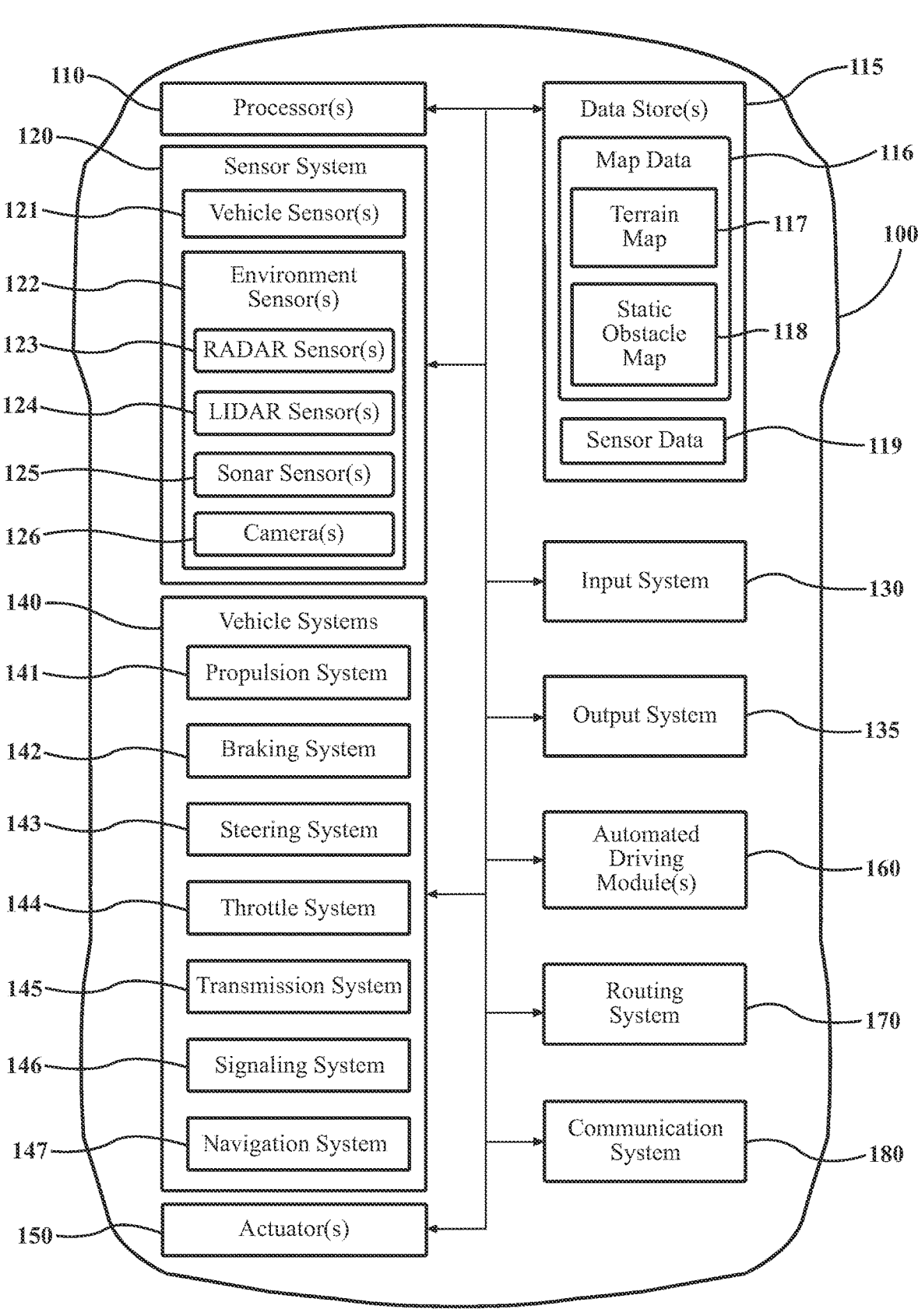
FIG. 1 illustrates one embodiment of a vehicle within which systems and methods disclosed herein may be implemented.

Systems, methods, and other embodiments associated with a manner of improving vehicle control for curved roadways through efficiently identifying road curvature using a point-based approach are disclosed. As previously noted, map data can be very granular, leaving characteristics about a roadway along a route with vague contextual information. Thus, vehicle systems and drivers may not be well informed about sharp turns and the general difficulty of navigating segments of a roadway.

Therefore, in one or more embodiments, a routing system is disclosed that dynamically assesses roadway curvature using an efficient approach to improve available information about the roadway, including the difficulty of navigating roadway segments. In one aspect, the routing system initially acquires a route for a vehicle to navigate. The vehicle may calculate the route according to route information that indicates a starting point (e.g., a current location of the vehicle) and a destination. The route is generally represented in the form of points that minimally define a geometry of the route in relation to associated roadways. That is, in order to simplify the representation, the route is not represented by lines and curves but is represented by a minimal set of points to approximate the route along various roadways. Thus, the points may be endpoints of a line that matches an underlying portion of a roadway corresponding to the route. As such, the points may be sparse where the route is generally straight since fewer points are necessary to accurately represent a straight road, whereas curves and turns may be represented with significantly more points because of the more complex geometry. However, explicit information about curvature is still not available to the driver or various vehicle systems through the point-based representation.

As such, the routing system functions to analyze the route to identify curves, including turns. Accordingly, the system segments the route to provide portions of the route for analysis. In one approach, the system considers various characteristics of the route in order to perform the segmenting. The characteristics generally relate to how a vehicle may traverse a particular point of the route. Thus, the characteristics include aspects, such as an expected speed at the point (e.g., a speed limit or commonly observed speed), a road type that may be informative of the speed, zones associated with the point (e.g., school zones), and so on. From these characteristics, the system defines the segments. In one arrangement, the system defines the segments by determining a length of each separate segment according to a distance the vehicle would likely travel on the road according to the expected speed, as defined in relation to each separate point, during a defined period of time (e.g., 20 seconds). In a further aspect, the system queries the points of the route according to a distance the vehicle is expected to travel and forms segments according to identified points within the distance or an extended distance when points are not returned. Thus, the separate segments may have different lengths according to variations in expected travel distance for a time period and/or according to the sparsity of points according to the queried distance. In any case, the system uses the segments to assess the route and determine point densities for the segments, which are generally indicative of the presence of a curve.

The system determines points of the route per segment, which generally indicates proximities of points within the segment. Because certain roadway features, such as curves, are represented using more points than straight sections of the roadway, the proximities (also referred to as densities) are indicative of the presence of curves within a segment. Accordingly, the system identifies the presence of curves according to the comparison of a proximity threshold that specifies, for example, a minimum density for the system to indicate the presence of a curve. Once curves have been identified, the system assigns difficulty indicators to the segments according to the curves. In one configuration, the system determines a severity of the curves according to the density for a particular segment and assigns the difficulty indicator as, for example, a score specifying the severity. Because more severe curves generally necessitate a greater extent of attention and/or skill to control the vehicle, the routing system can distinguish between the curves to provide awareness of the upcoming geometry of the roadway.

Thereafter, the system provides the difficulty indicators in various forms depending on the implementation in order to improve control of the vehicle. For example, the system can provide audible alerts, visual alerts, or other indicators to the driver about the difficulty/geometry of the segments when approaching. In a further aspect, the system provides information to, for example, an automated driving module (e.g., a path planning system) in order to provide awareness to the module about the upcoming geometry of the roadway, thereby facilitating improved control. In this way, the system improves the control of the vehicle along roads with curves.

Referring to FIG. 1, an example of a vehicle 100 is illustrated. As used herein, a "vehicle" is any form of transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers, such as a bicycle, an electric bike, an electric scooter, and so on. In various approaches, the vehicle 100 may be an automated vehicle. As used herein, an automated vehicle refers to a vehicle with at least some automated driving functions. Thus, the vehicle 100 may operate autonomously, semi-autonomously, or with the assistance of various advanced driving assistance systems (ADAS). Further, the vehicle 100 may be a connected vehicle that is capable of communicating wirelessly with other devices, such as other connected vehicles, infrastructure elements (e.g., roadside units), cloud-computing elements, and so on. Moreover, while the present disclosure is generally described in relation to the vehicle 100, in yet further approaches, the noted systems and methods disclosed herein may be implemented as part of other entities, such as electronic devices that are not associated with a particular form of transport. That is, the systems and methods may be embedded as part of a mobile electronic device that can be, for example, carried by an individual and that may function independently or in concert with additional systems (e.g., sensors) of other devices.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a cloud environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-7 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a routing system 170 that is implemented to perform methods and other functions as disclosed herein relating to improving vehicle control for curved roadways through efficiently identifying road curvature using a point-based approach.

Moreover, the routing system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the routing system 170 can leverage various wireless communication technologies to provide communications to other entities, such as members of the cloud-computing environment.

Figure 2:
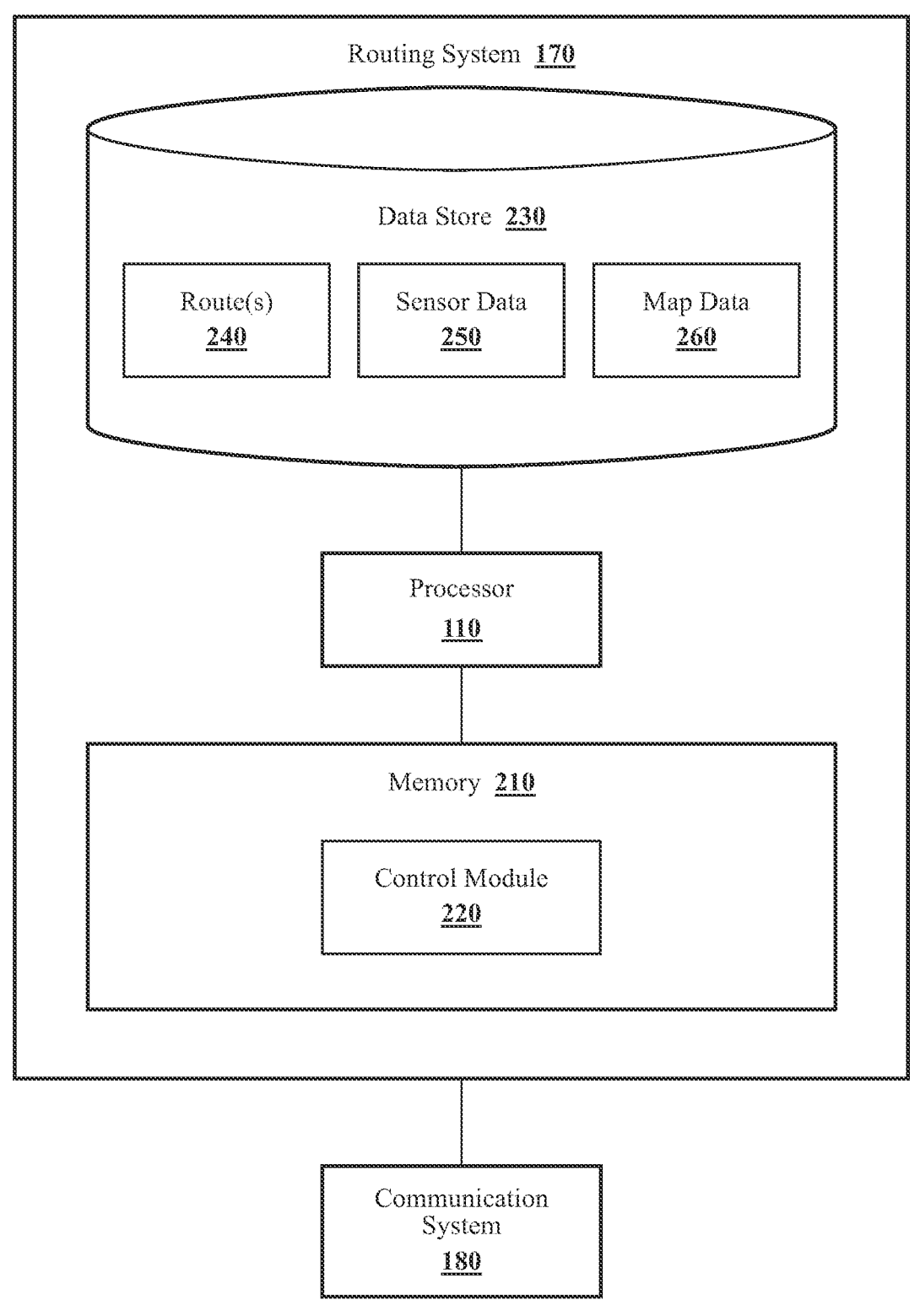
FIG. 2 illustrates one embodiment of a routing system associated with improving vehicle control for curved roadways through efficiently identifying road curvature using a point-based approach.

With reference to FIG. 2, one embodiment of the routing system 170 is further illustrated. The routing system 170 is shown as including a processor 110 from the vehicle 100 of FIG. 1. Accordingly, the processor 110 may be a part of the routing system 170, the routing system 170 may include a separate processor from the processor 110 of the vehicle 100 or the routing system 170 may access the processor 110 through a data bus or another communication path. In further aspects, the processor 110 is a cloud-based resource. Thus, the processor 110 may communicate with the routing system 170 through a communication network or may be co-located with the routing system 170. In one embodiment, the routing system 170 includes a memory 210 that stores a control module 220. The memory 210 is a random-access memory (RAM), read-only memory (ROM), a hard-disk drive, a flash memory, or other suitable memory (either volatile or non-volatile) for storing the module 220 and/or other information used by the routing system 170. The module 220 is, for example, computer-readable instructions within the physical memory 210 that, when executed by the processor 110, cause the processor 110 to perform the various functions disclosed herein.

Figure 3:
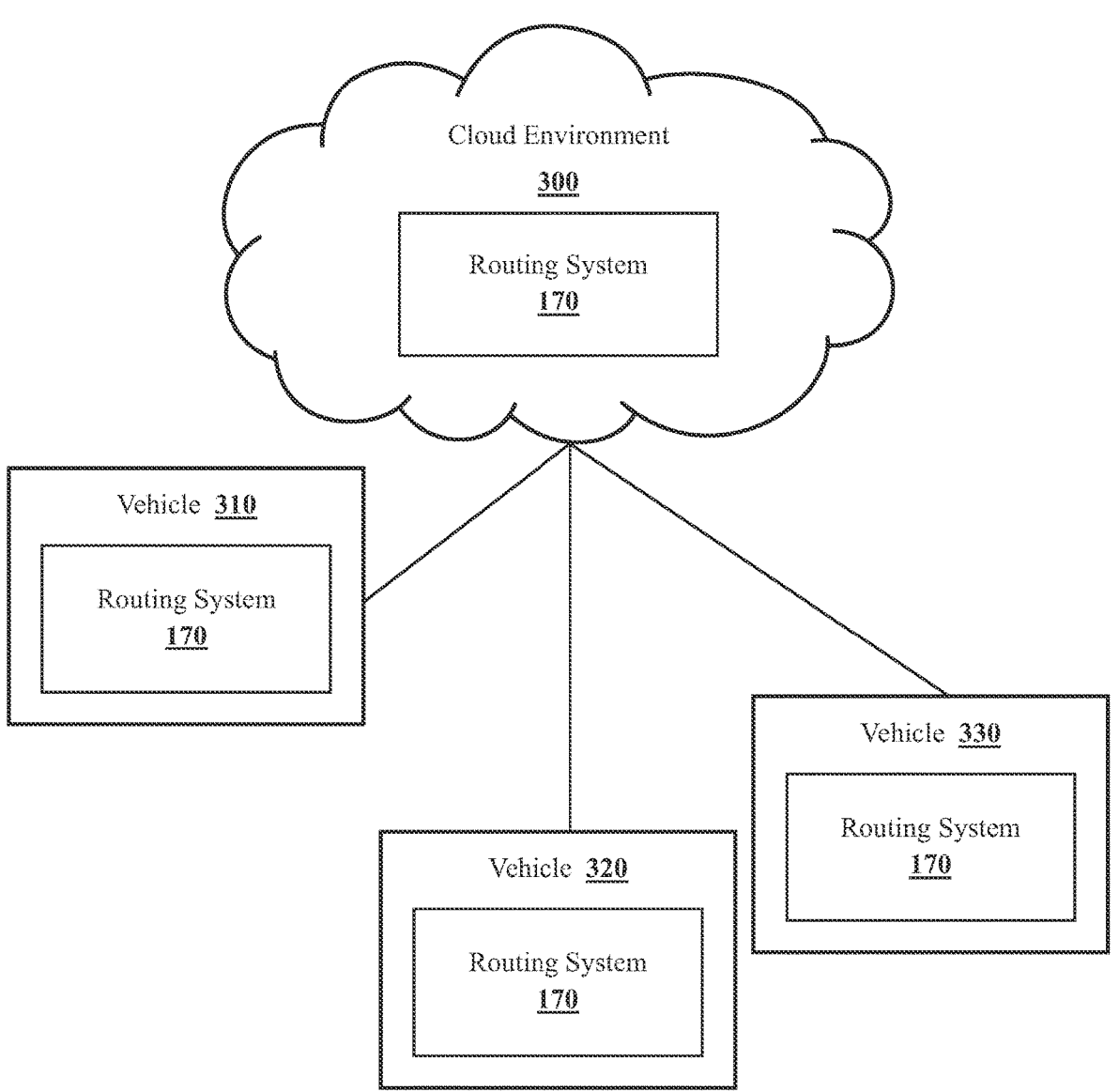
FIG. 3 illustrates a diagram of a routing system within a cloud-computing environment.

As previously noted, the routing system 170 may be further implemented within the vehicle 100 as part of a cloud-based system that functions within a cloud environment 300, as illustrated in relation to FIG. 3. That is, for example, the routing system 170 may acquire data (e.g., telematics data, sensor data, etc.) from various entities, such as distributed vehicles implementing separate instances of the routing system 170. Accordingly, as shown, the routing system 170 may include separate instances within one or more entities of the cloud-based environment 300, such as servers, and also instances within vehicles that function cooperatively to acquire, analyze, and distribute the noted information. In a further aspect, the entities that implement the routing system 170 within the cloud-based environment 300 may vary beyond transportation-related devices (e.g., vehicles 310, 320, and 330) and encompass mobile devices (e.g., smartphones), and other such devices that may be carried by an individual within a vehicle, and thereby can function in cooperation with the vehicle. Thus, the set of entities that function in coordination with the cloud environment 300 may be varied. The cloud-based environment 300 itself can function to perform various functions in place of performing the functions within the separate vehicles. As discussed in greater detail subsequently, an instance of the routing system 170 within the cloud environment 300 may function to calculate a route, and determine difficulty indicators on behalf of a client instance within a vehicle (e.g., vehicle 310). Thus, the vehicle 310 can offload the task to the cloud environment 300 and then use the difficulty indicators, as generated by the cloud-based instance, to improve control of the vehicle over a route, as discussed further subsequently.

Continuing with FIG. 2 and a general embodiment of the routing system 170, in one or more arrangements, the routing system 170 includes a data store 230. The data store 230 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes route(s) 240, sensor data 250, map data 260, and/or other information that is used by the module 220. It should be appreciated that while the data store 230 is shown as including route(s) 240, sensor data 250, map data 260, separate instances of the routing system 170 may implement the data store 230 to include different sets of information.

In any case, the control module 220 includes instructions that function to control the processor 110 to acquire the sensor data 250. Accordingly, the control module 220, in one embodiment, controls respective sensors of the vehicle 100 to provide data inputs in the form of the sensor data 250. The control module 220 may further process the sensor data into separate observations of the surrounding environment. For example, the control module 220, in one approach, fuses data from separate sensors to provide an observation about a particular aspect of the surrounding environment. By way of example, the sensor data itself, in one or more approaches, may take the form of separate images, radar returns, LiDAR returns, and so on. The control module 220 may derive determinations (e.g., speed, position, etc.) from the sensor data and fuse the data for separate aspects of the surrounding environment (e.g., roadway features, objects, etc.).

Additionally, while the control module 220 is discussed as controlling the various sensors to provide the sensor data 250, in one or more embodiments, the module 220 can employ other techniques that are either active or passive to acquire the sensor data. For example, the control module 220 may passively sniff the sensor data from a stream of electronic information provided by the various sensors to further components within the vehicle 100. Moreover, as noted, the control module 220 can undertake various approaches to fuse data from multiple sensors when providing the sensor data. Thus, the sensor data 250, in one embodiment, represents a combination of perceptions acquired from multiple sensors.

Of course, depending on the sensors that the vehicle 100 or other entity includes, the available sensor data that routing system 170 can harvest may vary. As one example, according to a particular implementation, the vehicle 100 may include different versions of an IMU sensor that are separately capable of different measurements about the movement of the vehicle 100. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the control module 220 may, in one or more approaches, be configured to adapt to different electronic inputs depending on the availability of such information.

Moreover, the sensor data 250 can include entity-specific data (i.e., data about the vehicle 100, such as the IMU data, vehicle control inputs, ABS activation, traction control activation, stability control activation, etc.) and/or environment-specific data, such as images from a camera, radar data, LiDAR data, etc. In any case, the control module 220 acquires the sensor data and generates observations therefrom. The control module 220 may use the sensor data 250 for various tasks, such as feedback to confirm derived difficulty indicators (e.g., to confirm the severity of a curve), identifying when the vehicle 100 is approaching a segment with a curve, and so on. In further aspects, the control module 220 may leverage the sensor data 250 to identify mitigating or enhancing circumstances that modify a difficulty of a segment, such as weather conditions, a presence of objects (e.g., other vehicles), and so on.

In any case, continuing with the data store 230, the route 240 includes stored information about a current route of the vehicle 100, while the map data 260 is geographic information about roadway networks for different regions in which the vehicle 100 navigates. In general, at least the route 240 is represented as a series of points. That is, instead of being represented by lines and curves, the routing system 170 represents the route as points along a roadway. The points may be endpoints of a line segment where the line segment corresponds to the roadway along the route. When the roadway curves or the route turns, the line segments are naturally shorter to accurately represent the route along the roadway and thus the points become closer together. Accordingly, a route along a straight stretch of road is represented with few points, while a curve/turn is represented with a greater number of points depending on the severity of the curve/turn.

In a further aspect, the map data 260 is information about a geographic area, such as an area in which the vehicle 100 is operating. The map data 260 includes at least representations of roads but may further include information about features of roads (e.g., lanes, crosswalks, etc.), traffic information (e.g., locations of traffic lights, road directions, etc.), points of interest, buildings, and so on. The vehicle 100 may store the map data 260 for a wide geographic area (e.g., a region, a state, or a country) or may dynamically acquire the map data 260 for a region as the vehicle 100 moves. In either case, the routing system 170 may use the map data 260 in combination with the route 240 to facilitate navigating the vehicle either manually or through automated processes (e.g., autonomous control). While the map data 260 and the route 240 include various information about roads, the map data 260 and the route 240 do not include explicit information about a severity of curves/turns or the difficulty of a given segment of road in relation to controlling a vehicle.

Accordingly, the control module 220, in at least one arrangement, includes instructions to control the processor 110 to derive additional information about a route 240. As an initial aspect, the control module 220 either acquires or generates the route 240. For example, in one arrangement, the control module 220 initially acquires route information. The route information includes at least a destination (i.e., endpoint) to which the vehicle 100 is to navigate. The destination may be selected by a user via an electronic interface with the vehicle 100 or may be preselected. The route information may further include a starting point or the control module 220 actively determines the starting point by using a current location of the vehicle, as may be acquired via GPS or another form of localization. Thus, the control module 220 can use the current location of the vehicle 100 as the starting point and calculate the route 240 according to the noted destination. In a further aspect, the routing system 170 uses another module/system to determine the route 240, such as navigation system 147 of the vehicle 100 or a cloud-based service (e.g., a routing service provided by the cloud-based environment 300). Whichever entity generates the route 240, the routing system 170 proceeds to further analyze the route 240 to determine which segments may represent areas of a road that are difficult to navigate.

As described herein, the difficulty of a segment in relation to navigating generally relates to a curvature of the segment or at least a portion thereof. Thus, the routing system 170 analyzes the route to identify curves through an assessment of the density/proximity of points within a given segment. Further aspects about the analysis of the route to determine a difficulty will be discussed subsequently in relation to FIG. 4.

Figure 4:
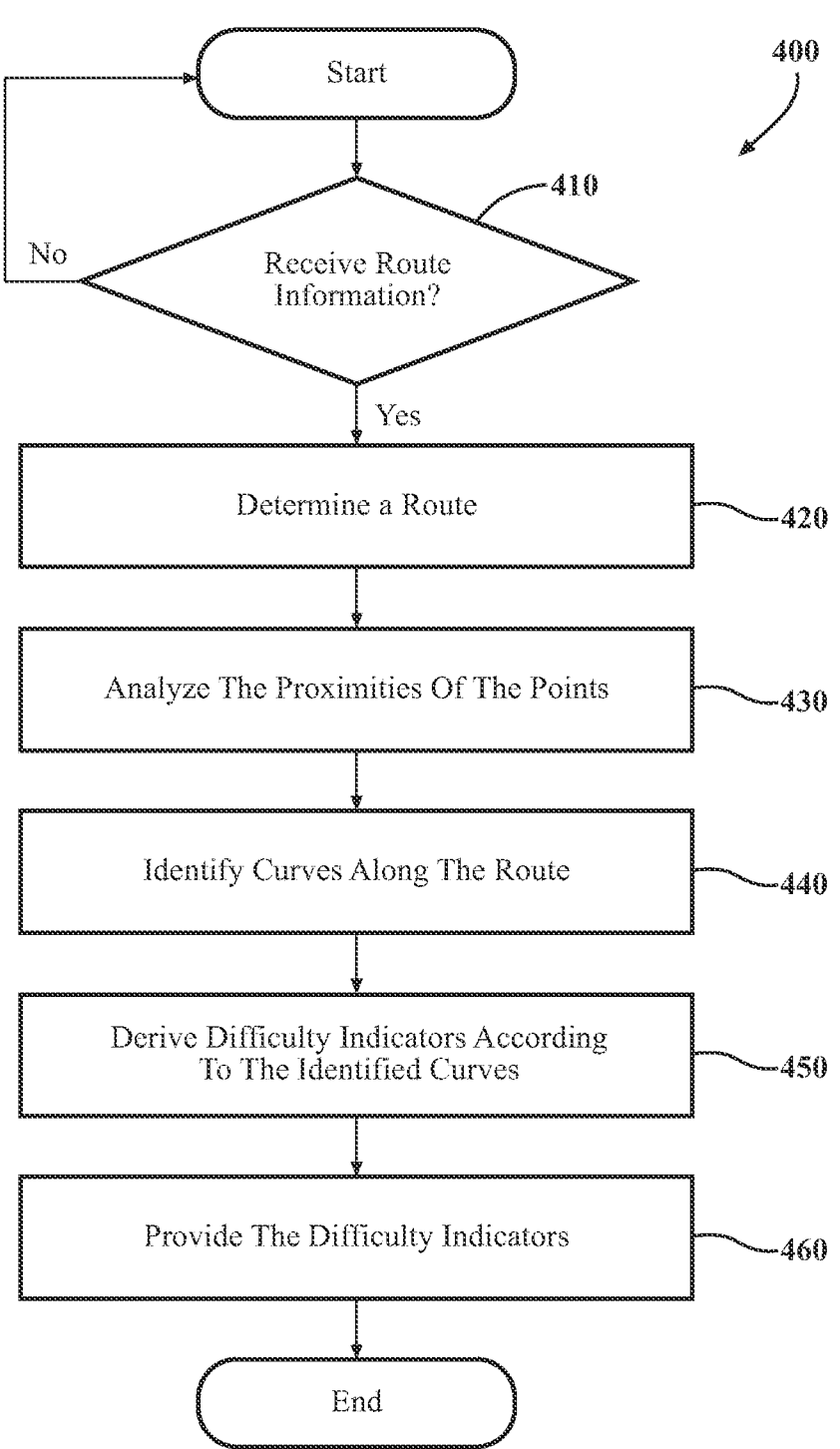
FIG. 4 is a flowchart illustrating one embodiment of a method associated with improving vehicle control for curved roadways through efficiently identifying road curvature using a point-based approach.

FIG. 4 illustrates a flowchart of a method 400 that is associated with identifying active regions where parking is limited and updating a parking map. Method 400 will be discussed from the perspective of the routing system 170 of FIGS. 1-2 as implemented by an entity, such as a server within the cloud-based environment 300. While method 400 is discussed in combination with the routing system 170, it should be appreciated that the method 400 is not limited to being implemented within the routing system 170 but is instead one example of a system that may implement the method 400. Furthermore, while the method is illustrated as a generally serial process, various aspects of the method 400 can execute in parallel to perform the noted functions.

At 410, the control module 220 monitors for route information. In one configuration, the control module 220 initiates determinations about curvature according to the generation of a route, which generally occurs upon receiving the route information. Of course, as previously described, the route information may initially be received by a separate entity, such as the cloud-based instance, a navigation system, and so on, in which case the routing module 220 may skip to analyzing the route 240, as discussed at block 430. In any case, the route information includes information for forming the route, such as a starting point, an endpoint, and preferences (e.g., types of roads, etc.). If no information for initiating a route is received at 410, then the control module 220 continues to monitor for the information. Otherwise, the control module 220 proceeds to determine the route at 420 or to 430 if the route is determined by another entity.

At 420, the control module 220 determines a route (i.e., route 240) for the vehicle 100. In one or more arrangements, the control module 220 calculates the route 240 for the vehicle 100 to follow according to the route information. As noted above, the routing system 170 represents the route 240 using points as opposed to explicit lines and curves. The points can be described as waypoints that are generally arranged in a series and have variable spacing that correspond with a geometry of the roadway. The points provide for an accurate representation of geometries of the route 240 using discrete information in the form of the points as opposed to complex curves. The manner of calculating the route 240 can vary depending on the implementation.

At 430, the control module 220 analyzes the proximities of the points within the route 240. In one configuration, first, the control module 220 defines segments over the route. The control module 220 may consider different characteristics of the points to define the segments. For example, as a general premise, the control module 220 may define a time that can be extrapolated into a length for each segment according to expected speeds over a section of road. In one arrangement, the control module 220 queries the points of the route according to a distance the vehicle is expected to travel (e.g., expected speed times a defined time) and forms segments according to identified points within the distance or an extended distance when points are not returned within the initial query. As a further example, the control module 220 may consider road type and expected speeds along a road to define separate segment lengths. In practice, the control module 220 assigns the characteristics to the separate points and determines which of the points are captured within a segment according to a distance the vehicle 100 would travel within the defined time based on the expected speed and road type. The road type can include, for example, highway, urban surface street, urban thoroughfare, divided roads, rural roads, bridges, and so on. The road type generally influences the expected speed according to traffic flow. Thus, the segments generally have different lengths depending on the associated characteristics. Alternatively, in a further aspect, the control module 220 may define explicit lengths for the segments. In any case, the control module 220 divides the route 240 into the segments in order to provide for discrete sections of the route to analyze.

Once the control module 220 defines the segments, the control module 220 analyzes proximities of the points over the segments. The proximities provide for identifying a density of points (also referred to as point densities) for separate ones of the segments. Thus, the control module 220, in at least one approach, counts the points for the respective segments. In an alternative approach, the control module 220 counts the points in a segment and divides the number of points by the length of the segment. This approach provides a point density per length of the route 240. The control module 220 may track the point densities in a list that correlates the densities with the segments. In this way, the control module 220 can assess the points per segment, thereby identifying which have greater densities.

At 440, the control module 220 identifies curves along the route 240 according to proximities of the points. In one approach, the control module 220 identifies a presence of the curves using a proximity threshold. The proximity threshold defines a value of the point density that is indicative of the presence of a curve. The proximity threshold can be statically defined, but in a separate approach may be defined according to each separate segment. For example, depending on a type of the road (e.g., urban street versus highway), the proximity threshold is adjusted. As one example, a curve having the same point density on an urban street is generally easier to navigate than a curve on a highway because of the difference in speed, a width of lanes, and so on. As such, the proximity threshold for a segment having the curve on the highway may be lower than the urban street. In any case, the control module 220 compares the point density for a segment against the proximity threshold for the segment. When the point density satisfies (e.g., meets, exceeds, etc.) the proximity threshold, then the control module 220 indicates the presence of a curve.

At 450, the control module 220 generates difficulty indicators for respective ones of the segments that include one or more curves. The difficulty indicators at least specify the presence of a curve as determined at 440. In further aspects, the difficulty indicators provide additional information, such as a severity of the curve in relation to the characteristics of the segment. For example, the control module 220 may adjust the difficulty indicator beyond a plain determination of the presence of a curve for factors, such as weather, traffic, a time of day at which the vehicle 100 is to navigate the segment, and so on. In one example, the control module 220 may adjust the difficulty indicator, which may be defined as an integer value from 0 to 100, by a defined percent for each separate factor. The defined percent for a factor may be predefined and stored in a lookup table. In any case, the control module 220 generates the difficulty indicators for at least the segments, including curves, and may further adjust the indicators according to various factors.

At 460, the control module 220 provides the difficulty indicators as the vehicle 100 encounters the segments. For example, the control module 220 can apply the difficulty indicators in different ways depending on aspects of the vehicle 100, such as whether the vehicle 100 is automated or manually controlled. In one configuration, the control module 220 provides the difficulty indicators by controlling one or more systems of the vehicle 100. For example, when the vehicle is manually controlled, the control module 220 controls the vehicle 100 to alert a driver using audible and/or visual alerts. The audible alerts may specify the presence of the difficult curve and a distance to the curve ahead in order to improve the awareness of the driver. As a further aspect, the control module 220 may reduce a volume of media playing within the vehicle 100. Similarly, the control module 220 can render visual alerts within an electronic display of the vehicle 100, such as within a navigation display that includes a map of the route 240, within an augmented reality (AR) display, and so on.

In the context of an automated vehicle (i.e., a vehicle with at least ADAS controlling one or more systems of the vehicle 100), the control module 220 may adjust a trajectory of the vehicle 100. For example, in the control module 220 may actively slow the vehicle 100 in preparation for the segment when a curve is present. In a further aspect, the control module 220 provides information about the segment to a planning system in order to better alert an automated driving module about the segment. The planning system may then adapt an upcoming trajectory for the vehicle 100 to better navigate the segment. As a further aspect, the control module 220 monitors a distance of the vehicle 100 to each segment and determines when to provide the difficulty indicators. For example, the control module 220 may specify a defined distance prior to a segment at which point the control module 220 provides the difficulty indicator. In this way, the routing system 170 improves control of the vehicle 100 through analysis of the route 240 and imparting additional knowledge about roadway features.

Figure 5:
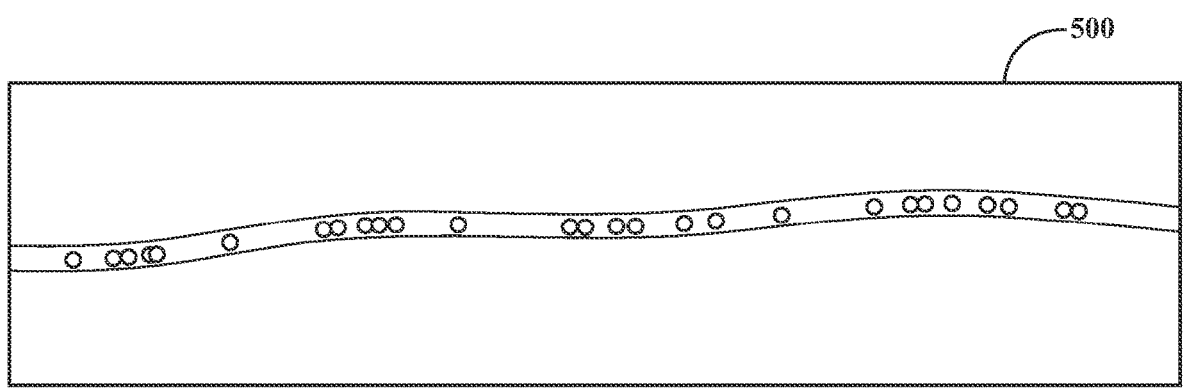
FIG. 5 is a diagram illustrating one embodiment of points for a route segment that is generally straight.

As a further explanation of the routing system 170, reference will now be made to FIGS. 5-7. FIG. 5 illustrates an example route 500 that is generally straight. As shown, the route 500 is represented by a series of points. The route 500 is shown with the point representation that illustrates how the routing system 170 considers the points over the segment but does not label any curve since the route 500 is generally straight. Thus, as shown, the points are generally sparse and include significant areas without any points because the corresponding road is straight.

Figure 6:
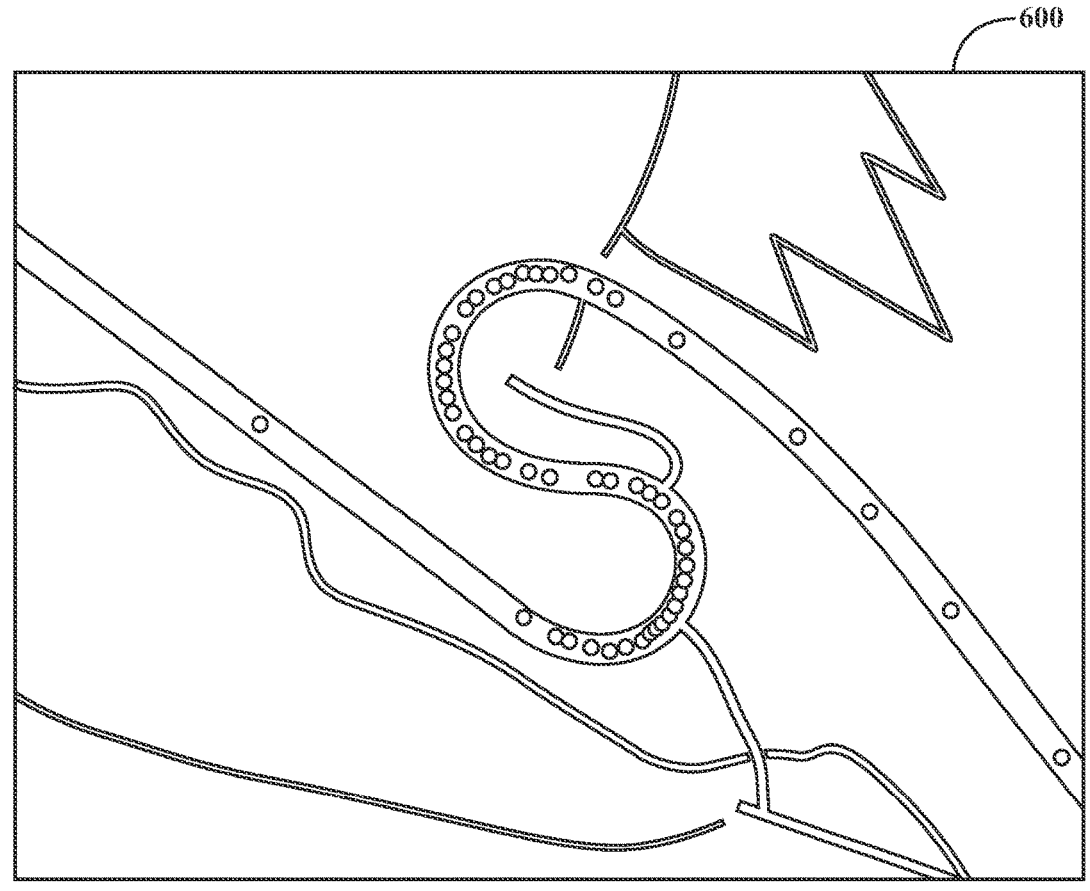
FIG. 6 is a diagram illustrating one embodiment of points for a route segment that includes an s-curve.
Figure 7:
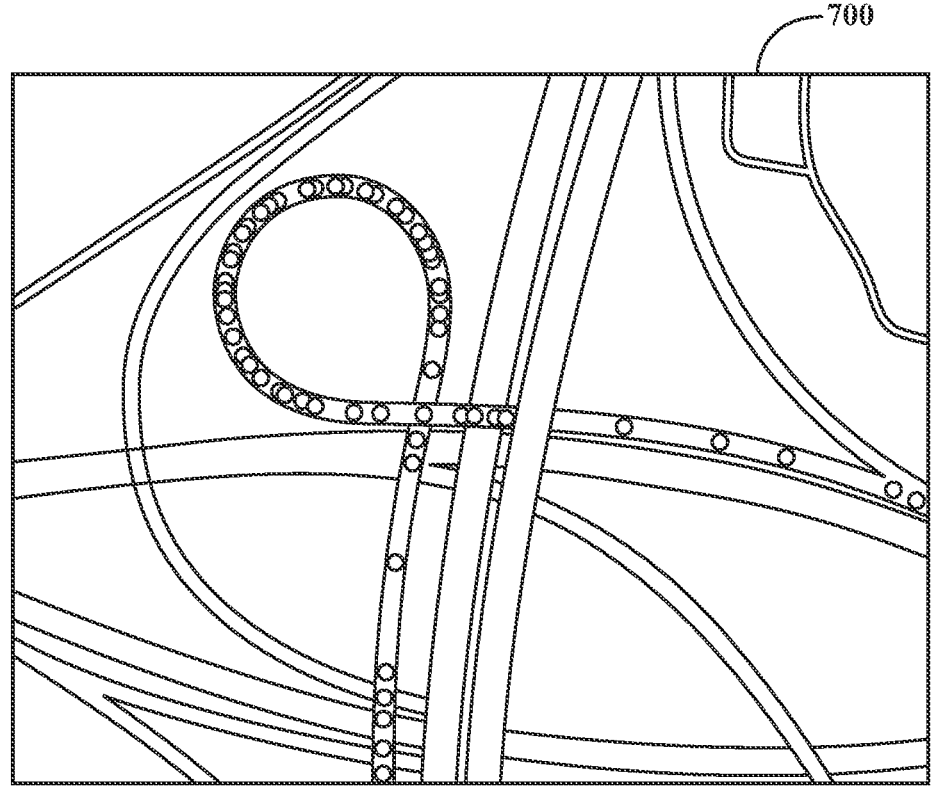
FIG. 7 is a diagram illustrating one embodiment of points for a route segment that includes a complex curve.

By contrast, FIG. 6 illustrates a route 600 over a segment that corresponds with an s-curve in a roadway. The route includes a plurality of closely-spaced points that correspond with the s-curve. Thus, the density/proximity of the points along the curve is much greater than in the straight section shown in FIG. 5. As a further example, FIG. 7 illustrates a ramp between two roads. A route 700 over the illustrated segment traverses an approaching roadway with few points (because the approach is generally straight) and then enters the ramp that is a significant curve in the roadway where the points are again closely spaced. Accordingly, the routing system 170 can function to identify the curves in routes 600 and 700 according to the point proximities from which various information can be provided to improve control of the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof configured to determine the geographic location of the vehicle 100 and/or to determine a travel route for the vehicle 100 by, for example, calculating the route over a road network from a current location to a destination. The navigation system 147 can include one or more mapping applications to determine a route for the vehicle 100. The navigation system 147 can include and/or at least access a global positioning system, a local positioning system, or a geolocation system.

The processor(s) 110, the routing system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the routing system 170, and/or the automated driving module(s) 160 can be in communication to send and/or receive information from the various vehicle systems 140 to control the movement, speed, maneuvering, heading, direction, etc. of the vehicle 100. The processor(s) 110, the routing system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the routing system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A routing system for improving vehicle control in relation to curved roadways, comprising:
   one or more processors;
   a memory communicably coupled to the one or more processors and storing instructions that when executed by the one or more processors cause the one or more processors to:
      in response to determining a route for a vehicle that is represented using points for navigating to a destination, identify one or more curves along the route according to proximities of the points, including instructions to generate point densities of the points for segments of the route, the segments being divisions of the route that each include a portion of the points;
      generate, based on the point densities, difficulty indicators for curved segments of the segments that include the one or more curves, including instructions to determine a severity of the one or more curves in relation to characteristics of associated ones of the segments; and
      provide the difficulty indicators to a module of the vehicle as the vehicle encounters the segments that include the one or more curves to adjust a trajectory of the vehicle in relation to the one or more curves.

2. The routing system of claim 1, wherein the instructions to identify the one or more curves include instructions to:
   analyze proximities of the points over segments of the route to generate the point densities for the segments; and
   determine a presence of the one or more curves along the route according to whether the point densities satisfy a proximity threshold indicating a respective one of the point densities correlate with a presence of a curve.

3. The routing system of claim 2, wherein the instructions to analyze the proximities include instructions to define the segments according to a road type, and an expected speed of the vehicle along separate portions of the route by individually defining lengths of the segments.

4. The routing system of claim 2, wherein the instructions to determine the presence of the one or more curves include instructions to separately determine the proximity threshold for the segments according to characteristics of the segments.

5. The routing system of claim 1, further comprising instructions to:
   receive route information that includes at least a starting point and an end point for navigating the vehicle; and
   calculate the route for the vehicle to follow according to the route information, wherein the route is comprised of the points in a series at variable spacing to accurately represent geometries of the route using discrete information in a form of the points.

6. The routing system of claim 1, wherein the instructions to provide the difficulty indicators include instructions to control one or more systems of the vehicle to perform at least one of: alerting a driver, and generating a visible alert within a display of the vehicle.

7. The routing system of claim 1, wherein the vehicle is an autonomous vehicle that navigates the route autonomously.

8. A non-transitory computer-readable medium storing instructions for improving vehicle control in relation to curved roadways and that, when executed by one or more processors, cause the one or more processors to:
   in response to determining a route for a vehicle that is represented using points for navigating to a destination, identify one or more curves along the route according to proximities of the points, including instructions to generate point densities of the points for segments of the route, the segments being divisions of the route that each include a portion of the points;
   generate, based on the point densities, difficulty indicators for curved segments of the segments that include the one or more curves, including instructions to determine a severity of the one or more curves in relation to characteristics of associated ones of the segments; and
   provide the difficulty indicators to a module of the vehicle as the vehicle encounters the segments that include the one or more curves to adjust a trajectory of the vehicle in relation to the one or more curves.

9. The non-transitory computer-readable medium of claim 8, wherein the instructions to identify the one or more curves include instructions to:
   analyze proximities of the points over the segments of the route to generate the point densities for the segments; and
   determine a presence of the one or more curves along the route according to whether the point densities satisfy a proximity threshold indicating the point densities correlate with a presence of a curve.

10. The non-transitory computer-readable medium of claim 9, wherein the instructions to analyze the proximities include instructions to define the segments according to a road type, and an expected speed of the vehicle along separate portions of the route by individually defining a length of the segments.

11. The non-transitory computer-readable medium of claim 9, wherein the instructions to determine the presence of the one or more curves include instructions to separately determine the proximity threshold for the segments according to characteristics of the segments.

12. A method, comprising:
   in response to determining a route for a vehicle that is represented using points for navigating to a destination, identifying one or more curves along the route according to proximities of the points, including generating point densities of the points for segments of the route, the segments being divisions of the route that each include a portion of the points;
   generating, based on the point densities, difficulty indicators for curved segments of the segments that include the one or more curves, including determining a severity of the one or more curves in relation to characteristics of associated ones of the segments; and
   providing the difficulty indicators to a module of the vehicle as the vehicle encounters the segments that include the one or more curves to adjust a trajectory of the vehicle in relation to the one or more curves.

13. The method of claim 12, wherein identifying the one or more curves includes:
   analyzing proximities of the points over the segments of the route to generate the point densities for the segments; and determining a presence of the one or more curves along the route according to whether the point densities satisfy a proximity threshold indicating the point densities correlate with a presence of a curve.

14. The method of claim 13, wherein analyzing the proximities includes defining the segments according to a road type, and an expected speed of the vehicle along separate portions of the route by individually defining a length of the segments.

15. The method of claim 13, wherein determining the presence of the one or more curves includes separately determining the proximity threshold for the segments according to characteristics of the segments.

16. The method of claim 12, further comprising:

receiving route information that includes at least a starting point and an end point for navigating the vehicle; and calculating the route for the vehicle to follow according to the route information, wherein the route is comprised of the points in a series at variable spacing to accurately represent geometries of the route using discrete information in a form of the points.

17. The method of claim 12, wherein providing the difficulty indicators includes controlling one or more systems of the vehicle to perform at least one of: alerting a driver, and generating a visible alert within a display of the vehicle.

\* \* \* \* \*